United States Patent [19]
Jaffe

[11] Patent Number: 6,089,871
[45] Date of Patent: Jul. 18, 2000

[54] MATHEMATICAL BOARD GAME

[76] Inventor: Andrew P. Jaffe, P.O. Box 70193, Stockton, Calif. 95267

[21] Appl. No.: 09/264,581

[22] Filed: Mar. 8, 1999

[51] Int. Cl.$^7$ .............................. G09B 19/02; A63F 3/06
[52] U.S. Cl. ........................................... 434/209; 273/271
[58] Field of Search ..................... 434/188, 193, 434/200, 204, 205, 209; 273/271, 292, 267, 299, 302

[56] References Cited

U.S. PATENT DOCUMENTS

| | | | |
|---|---|---|---|
| 481,859 | 8/1892 | George | 273/271 |
| 1,564,746 | 12/1925 | Barnard | 273/271 |
| 2,264,492 | 12/1941 | Weaver | 434/209 |
| 3,111,320 | 11/1963 | Acosta | 273/271 |
| 3,649,023 | 3/1972 | Schon | 273/271 |
| 3,869,124 | 3/1975 | Stein | 434/209 |
| 3,975,021 | 8/1976 | Brown | 273/271 |
| 4,092,029 | 5/1978 | Jones | 273/271 |
| 4,302,015 | 11/1981 | Bowser | 273/271 |
| 5,083,793 | 1/1992 | Sanford | 273/249 |
| 5,242,171 | 9/1993 | Hata | 273/292 |
| 5,478,087 | 12/1995 | Dumisani | 273/272 |
| 5,601,288 | 2/1997 | White | 273/271 |
| 5,704,790 | 1/1998 | Moses | 434/209 |
| 5,927,717 | 7/1999 | Berkovi | 273/271 |

*Primary Examiner*—Robert A. Hafer
*Assistant Examiner*—Kurt Fernstrom

[57] ABSTRACT

A method and apparatus for teaching mathematical skills to players of all ages includes a game board having 100 spaces printed on a first board side, the spaces numbered from one to ninety-nine and having one logo space. Each space, in addition, has printed on it a prime number factorization, an exponential representation, or both, corresponding to the number contained within the particular space. Each player rolls a plurality of dice having prime numbers assigned to each die face. The object of the game is for players to score points by occupying board spaces between spaces imprinted with prime numbers. A space is occupied by applying the rolled dice to match a prime number factorization of a particular space, whereupon a chip is placed on the particular space to denote ownership. The dice used to occupy a space are then no longer used for occupying other spaces during a round of play. Points are awarded for each space occupied, and bonus points are awarded by occupying consecutive spaces between spaces having prime numbers imprinted thereon.

8 Claims, 7 Drawing Sheets

| 2·3²·5 90 2x3x3x5 | 91 7x13 | 2²·23 92 2x2x23 | 93 3x31 | 94 2x47 | 95 5x19 | 2⁵·3 96 2x2x2x2x3 | (97) | 2·7² 98 2x7x7 | 3²·11 99 3x3x11 |
|---|---|---|---|---|---|---|---|---|---|
| 2⁴·5 80 2x2x2x2x5 | 3⁴ 81 3x3x3x3 | 82 2x41 | (83) | 2²·3·7 84 2x2x3x7 | 85 5x17 | 86 2x43 | 87 3x29 | 2³·11 88 2x2x2x11 | (89) |
| 70 2x5x7 | (71) | 2³·3² 72 2x2x2x3x3 | (73) | 74 2x37 | 3·5² 75 3x5x5 | 2²·19 76 2x2x19 | 77 7x11 | 78 2x3x13 | (79) |
| 2²·3·5 60 2x2x3x5 | (61) | 62 2x31 | 63 3x3x7 | 2⁶ 64 2x2x2x2x2x2 | 65 5x13 | 66 2x3x11 | (67) | 2²·17 68 2x2x17 | 69 3x23 |
| 2·5² 50 2x5x5 | 51 3x17 | 2²·13 52 2x2x13 | (53) | 2·3³ 54 2x3x3x3 | 55 5x11 | 2³·7 56 2x2x2x7 | 57 3x19 | 58 2x29 | (59) |
| 2³·5 40 2x2x2x5 | (41) | 42 2x3x7 | (43) | 2²·11 44 2x2x11 | 3²·5 45 3x3x5 | 46 2x23 | (47) | 2⁴·3 48 2x2x2x2x3 | 7² 49 7x7 |
| 30 2x3x5 | (31) | 2⁵ 32 2x2x2x2x2 | 33 3x11 | 34 2x17 | 35 5x7 | 2²·3² 36 2x2x3x3 | (37) | 38 2x19 | 39 3x13 |
| 2²·5 20 2x2x5 | 21 3x7 | 22 2x11 | (23) | 2³·3 24 2x2x2x3 | 5² 25 5x5 | 26 2x13 | 3³ 27 3x3x3 | 2²·7 28 2x2x7 | (29) |
| 10 2x5 | (11) | 12 2x2x3 | (13) | 14 2x7 | 15 3x5 | 2⁴ 16 2x2x2x2 | (17) | 2·3² 18 2x3x3 | (19) |
| Prime Time | 1 | (2) | (3) | 2² 4 2x2 | (5) | 6 2x3 | (7) | 2³ 8 2x2x2 | 3² 9 3x3 |

FIG. 1a

| 90 | 91 | 92 | 93 | 94 | 95 | 96 | (97) | 98 | 99 |
|---|---|---|---|---|---|---|---|---|---|
| 80 | 81 | 82 | (83) | 84 | 85 | 86 | 87 | 88 | (89) |
| 70 | (71) | 72 | (73) | 74 | 75 | 76 | 77 | 78 | (79) |
| 60 | (61) | 62 | 63 | 64 | 65 | 66 | (67) | 68 | 69 |
| 50 | 51 | 52 | (53) | 54 | 55 | 56 | 57 | 58 | (59) |
| 40 | (41) | 42 | (43) | 44 | 45 | 46 | (47) | 48 | 49 |
| 30 | (31) | 32 | 33 | 34 | 35 | 36 | (37) | 38 | 39 |
| 20 | 21 | 22 | (23) | 24 | 25 | 26 | 27 | 28 | (29) |
| 10 | (11) | 12 | (13) | 14 | 15 | 16 | (17) | 18 | (19) |
| Prime Time | 1 | (2) | (3) | 4 | (5) | 6 | (7) | 8 | 9 |

MATHEMATICAL BOARD GAME

BACKGROUND OF THE INVENTION

I. Field of the Invention

The present invention relates generally to a board game and, in particular, discloses a mathematical board game wherein the scoring is provided by players successfully occupying one or more spaces between two prime number spaces located on a game board.

II. Description of the Related Art

Arithmetic and mathematical skills are often difficult for children to acquire. The abstract use and manipulation of numbers is not generally an inherently obvious operation to most children, and the application of such operations to something which they can readily see or use is often of great assistance in teaching basic arithmetic and mathematics to children and others.

Early development of mathematical skills is crucial to children. Unless mathematical skills are understood at an early age, problems in learning math may grow as a child continues his or her schooling. In many instances, young children are taught to memorize concepts without really understanding what it is that they are learning. For instance, children are often encouraged to memorize multiplication tables as a way to understand multiplication. What often occurs is that children fail to completely memorize all the various permutations, leaving one or more combinations that go unlearned. Frustration may develop if the unlearned combinations are not overcome, leading to a lack of confidence when learning new mathematical concepts in future years. Students' self esteem may suffer as a result of not understanding more and more complex mathematical concepts. As a result, children often perform poorly in math throughout their middle school and high school years. Teachers and parents may lower their expectations in response to a child's poor performance, and the failure perpetuates itself.

In an effort to teach mathematical skills to children and others, challenging board games have been designed in the past to promote learning of basic mathematical skills. Many times, it is the purpose of these games to provide a challenge to the player which will test mathematical and reasoning skills. However, most of these games are targeted at a limited age range and only focus on a narrow range of mathematical skills to be learned. For example, many mathematical games are targeted at pre-school children and teach basic addition and subtraction skills. Other games are targeted at elementary school students and teach more complicated skills, such as multiplication, division, and fractions. Such games are not suitable for players who do not fall within the targeted age group for the specific game in question. In addition, most of these mathematical teaching games require at least basic mathematical skills prior to playing. Without basic mathematical skills, most mathematical games, even those geared towards young children, are not suitable for very young players. As a result, critical mathematical skills are not learned as early in life as might be otherwise. In general, older children become bored quickly with games that are designed for younger players, and younger children become frustrated and lose interest quickly in games that are too advanced for them. One other drawback to most mathematical games is that once they are played several times, the answers are known and the novelty wears out quickly.

For example, U.S. Pat. No. 4,565,374 to Pak discloses a mathematical game wherein contiguous sequences of numbered tiles are formed by blindly drawing tiles from a bag, shielding them from the opponent, and placing these tiles—distinguishable from the opponent's tiles by color—on the playing surface to form a sum which is a multiple of 10. Duplicate numbers as are allowed on the board which make tracing, and thus, strategizing difficult. The purpose of this game is to outscore the opponent by forming defined sequences of numbered tiles whose sum is greater than a predetermined number. No points, however, may be scored by virtue of a sequence consisting of tiles of two different players.

U.S. Pat. No. 3,460,835 to Cans shows a game of similar construction where ranks and files are used to form sequences of numbered tiles which have again been blindly drawn from a bag. The tiles are shielded from the opponent, and one player scores along ranks only, while the other is allowed to score along files only. The purpose of this game is to form sequences of tiles which sum as close as possible to a single, predetermined number (175 in the preferred embodiment of the game).

U.S. Pat. No. 5,120,226 to Tsai shows a simple mathematical teaching aid which essentially is an array of ranks and files which accept numbered cubes used to form products of positive integers. An integral part of this teaching aid is a multiplication table which slides under the ranks and files for checking the accuracy of the multiplication.

U.S. Pat. No. 3,545,101 to Fike shows a mathematical game composed of ranks and files of integers in random order. This game requires an instructor, and can be played by several players, each with his own game board. The instructor calls out an arithmetic problem and each student marks what he believes to be the correct answer on his board. The first student to correctly mark one full row or one full column is the winner of the game.

U.S. Pat. No. 3,659,851 to Lang discloses an elementary mathematics/tic-tac-toe game involving a rectangular array of ranks and files. While the prior art board games provide entertainment, education and support the application of play-by-play, the prior art fails to disclose a game which can be used by younger and older players alike. In addition, most of these games require at least some knowledge of mathematics prior to playing them. Finally, most of these games depend on players simply memorizing multiplication tables as an aid to understanding math.

What is needed is an entertaining mathematical board game which enables players of virtually any age to play, without requiring prior mathematical skills. The game should also approach mathematical learning from an interesting and helpful point of view to reduce anxiety when learning new math skills and allowing players to develop strategic skills as well.

SUMMARY OF THE INVENTION

It is an object of the present invention to overcome the deficiencies of the prior art and provide a novel and entertaining mathematical board game for all ages.

It is a further object of the present invention to require strategy, but not necessarily prior mathematical knowledge, to play the game.

It is yet another object of the present invention to provide a mathematical board game which enhances the ability to add, subtract, multiply, and divide and which teaches mathematical concepts that can be applied to more complex mathematical concepts in a player's future, such as the addition, subtraction, division, and multiplication of fractions and exponents.

It is yet another object of the present invention to provide a mathematical board game which is non-threatening to players so that they will become comfortable with mathematical concepts in the future.

It is a further object of the present invention to provide a method of playing a multiplication board game wherein players are each provided a predetermined number of markers, or chips, the chips used to occupy spaces imprinted on a game board and points being awarded for each space occupied, plus bonus points for occupying contiguous spaces, either vertically, horizontally, or diagonally, between spaces having prime numbers imprinted thereon.

It is a further object of the present invention to provide a mathematical board game wherein numbered spaces on a board are occupied by each player alternately rolling a predetermined number of dice, the dice having prime numbers imprinted thereon, wherein each space on the board comprises a corresponding prime number factorization and the factors must be matched to the corresponding dice in order for a space to be occupied.

The present invention is a method and apparatus for teaching mathematical skills to players of all ages. In accordance with a first embodiment, a game board is provided having 100 spaces printed on a first board side, the spaces numbered from one to ninety-nine and having one space not numbered. Each numbered space, in addition, has printed on it prime number factorizations and exponential representations corresponding to the particular numbered space. Spaces comprising prime numbers are specially marked and contain no prime number factorization or exponential representations. The object of the game is to obtain more points than the other players by occupying spaces on the board. Each player, in turn, rolls a predetermined number of dice having prime numbers imprinted thereon. A space is occupied by matching the prime number factorization of a particular space with the dice, using one die for each prime factor relied upon. Spaces containing prime numbers are not occupied. Players alternate occupying spaces until no further spaces can be occupied by any player, or a predetermined time period expires, or a predetermined point total is reached. Points are awarded for each space occupied, plus additional bonus points are awarded for occupying contiguous spaces, either horizontally, vertically, or diagonally, between spaces having prime numbers imprinted thereon.

In a second embodiment of the present invention, a game board is provided having 100 spaces printed on a second side of the game board, the spaces numbered from one to ninety-nine and having one space not numbered. However, in this embodiment, no prime number factorizations or exponential representations of the numbered spaces are provided. This embodiment is used by advanced players who are familiar with prime number factorizations and exponential representations and who do not need to rely on having this information printed for each space. This embodiment of the game board is also used for a combination addition and subtraction game.

These and other objects of the present invention will become apparent from the detailed description below.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 1a and 1b illustrate the apparatus of the present invention comprising a game board having two sides;

FIG. 2 shows a magnified view of a typical space located on a first side of the game board of FIG. 1a;

FIG. 5 illustrates a magnified view of the a first side of the game board of FIG. 1a.

DETAILED DESCRIPTION OF THE PREFERRED EMBODIMENTS

Figure 2:
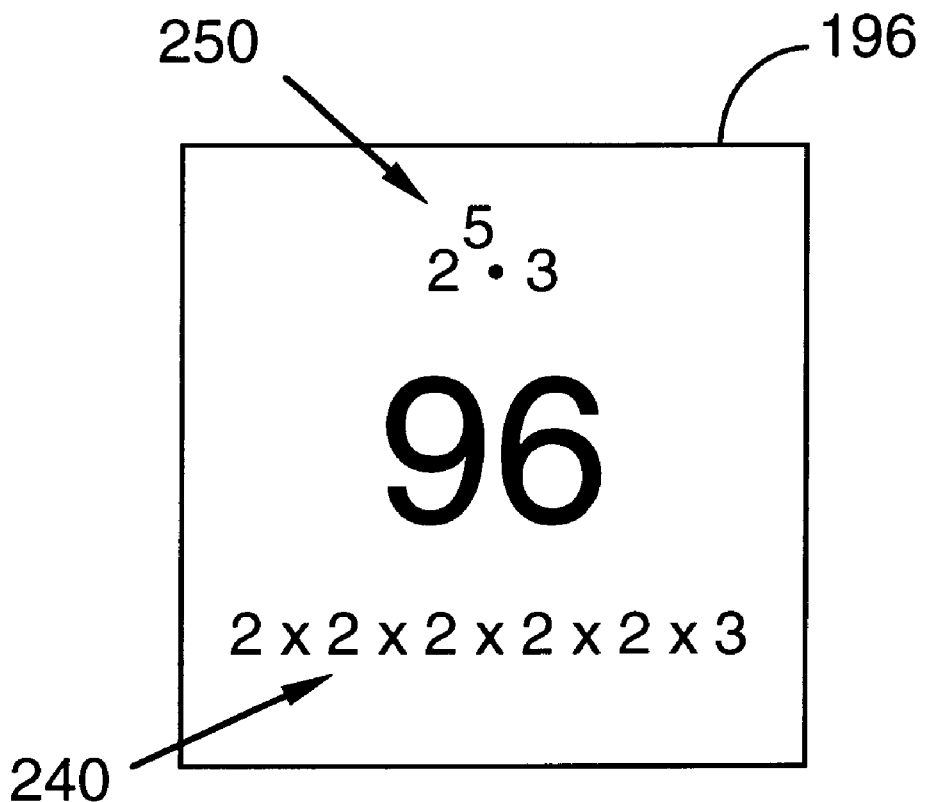

The present invention is a mathematical board game designed to aid children of all ages understand mathematical concepts in a non-threatening manner. The game promotes the development of strategic and tactical skills while enhancing a large number of mathematical skills including addition, subtraction, multiplication, division, prime number factorizations, and the addition, subtraction, multiplication, and division of fractions and exponents.

At least two types of mathematical games may be played using the mathematical game board of the present invention. The first type is a multiplication game and a second is a combination addition and subtraction game. In the multiplication game, the present invention relies on representing numbers as a product of two or more prime numbers, otherwise known as a prime number factorization. As an additional learning tool, the present invention also uses exponential representations of numbers. By representing numbers as a prime number factorization or an exponential representation, multiplication and division of fractions, exponents, and variables becomes easier to understand and to compute. For example, division of integers becomes simplified by breaking down a divisor and dividend into prime number factorizations, then simply canceling common terms. Multiplying exponents becomes simply a matter of addition of exponents having like base numbers. Factorization is also useful for addition and division of fractions: by breaking down denominators into prime factorizations, one can readily see what prime numbers are needed to equate unlike denominators, so that a simple addition or subtraction can take place.

For purposes of promoting an understanding of the principles of the invention, reference will now be make to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. For example, although the present invention is described in terms of a physical game board, it could also be implemented in computer software and played as a computer game.

Reference is now made to FIG. 1a, which illustrates a first side of game board 200, having a first side 210 comprising one hundred spaces of equal size, arranged in a 10×10 matrix. Game board 200 is used for both the multiplication game and the addition/subtraction game, as will be explained later herein. It should be understood that game board 200 could comprise a greater or lesser number of spaces arranged in other matrix arrangements, such as a 5×20 matrix, or a board having 64 spaces arranged in an 8×8 matrix. In addition, any geometric shape could be used instead of the square shape which defines the spaces as shown in FIG. 1a. For example, each space could comprise a circular or triangular shape.

Game board 200 additionally comprises a second side 215 as shown in FIG. 1b, also having one hundred spaces of equal size, arranged in a 10×10 matrix, in the exemplary embodiment. Generally, the number and shape of the spaces comprising first side 210 and second side 215 are substantially similar to each other. In further discussion of the present invention, reference shall be made to first side 210, unless otherwise noted.

Each space has assigned to it a unique integer, ranging from 1 to 99 in the exemplary embodiment, and one space not having an integer assigned. The space not having an integer assigned, called a blank space or logo space 100, is place in the bottom left corner of game board 200. Logo space 100 may be completely blank or have a logo or other nomenclature imprinted thereon, such as the name of the game. A space 101 having an integer "1" imprinted substantially in the center of space 101, is located immediately to the right of logo space 100. Immediately to the right of space 101 is space 102 having a "2" imprinted substantially in the center of space 102. Adjacent to space 102 is space 103 having a "3" imprinted substantially in the center of space 103. Each space on game board 200 is numbered in a similar fashion, being consecutively numbered from left to right, ending with space 109 on the bottom right corner of game board 200 having a "9" imprinted thereon. The numbering continues with space 110, located immediately above space 100, imprinted with a "10" substantially in the center of space 110. Immediately to the right of space 110 is space 111, having an "11" imprinted substantially in the center of space 111. Numbering continues in a similar fashion for all spaces on game board 200, up to the maximum number of spaces comprising game board 200.

Of course, the above description of game board 200 is intended to illustrate a preferred embodiment of the invention. Many alternative variations of game board 200 are possible without affecting the inventive concepts of the present invention. For example, space numbering could begin at any one of the four corners of game board 200, having numbering increasing in subsequent spaces vertically or horizontally. In addition, space numbering is not limited to integers 1 through 99. Any variation may be used, such as using integers 2 through 100, 3 through 101, −99 through +99, and so on.

In addition to a unique integer imprinted on each space, other information is imprinted as well, as shown in FIG. 2. FIG. 2 shows a magnified view of a typical space located on game board 200, in this case space 196. In the exemplary embodiment, a prime number factorization 240 is also imprinted on each space on game board 200 corresponding to the integer which appears on the space, in this case, 96. In general, a prime number factorization presents an integer as a series of factors, all of the factors being prime numbers. In the exemplary embodiment, prime number factorization 240 does not include "one" as a factor because one, by definition, is not a prime number. Spaces containing a prime number do not have a prime number factorization imprinted thereon. There are 25 prime numbers between 1 and 99. They are: 2, 3, 5, 7, 11, 13, 17, 19, 23, 29, 31, 37, 41, 43, 47, 53, 59, 61, 67, 71, 73, 79, 83, 89, and 97.

Referring again to FIG. 2, prime number factorization 240 in space 196 is equal to "2×2 ×2×2×2×3". These factors, when multiplied together, equal "96", the integer imprinted on space 196. Each space on game board 200, except for spaces having a prime number imprinted thereon, comprises a prime number factorization equal to the integer corresponding to the particular space. For example, space 114, having an integer "14" imprinted thereon, also comprises a prime number factorization equal to "2×7". Space 112, having an integer "12" imprinted thereon, also comprises a prime number factorization equal to "2×2×3". Spaces containing a prime number have no prime number factorizations associated with them simply because the prime number factorization is equal to the particular prime number multiplied by "one". However, in the exemplary embodiment, spaces containing a prime number are specially designated by having a circle drawn around the prime number, represented in integer form. Other designations are, of course, possible, such as using other geometric shapes or by adding color to either the space or to the prime number integer to differentiate the space from spaces containing non-prime numbers. The reason for this special designation will be explained later herein.

Spaces containing prime numbers used most often in the game, such as 2, 3, 5, and/or 7, could also be associated with a unique color or have a unique geometric shape assigned to such a space. For example, space 102, containing prime number 2, could also contain a small square; space 103, containing prime number 3, could also contain a small circle; space 105, containing prime number 5, could also contain a small triangle; and space 107, containing prime number 7, could also contain a small star. The geometric shapes may then be located in every space in which the representative prime number is a factor. For example, space 110, containing the number 10, could have a small square and a star imprinted thereon. The geometric shapes could also be imprinted on corresponding die faces or uniquely colored to match prime numbers on the dice. For example, the small square on space 102 could be colored green and each dice face containing a 2 could be colored green to match the green square. The geometric shapes and/or colors help players remember which prime numbers are factors of other numbers, especially larger numbers.

Referring again to FIG. 2, a second representation of integer "96" is shown as exponential representation 250. Exponential representation 250 is not a necessary feature of game board 200, however it may be included as a further aid to learning by exposing players to exponents and equating them to the more familiar prime factor representations. The exponential representation in the exemplary embodiment requires an integer to be expressed in prime numbers. For example, the exponential representation for integer "96" comprises $2^5 \cdot 3$, the "•" representing multiplication.

Each space containing a non-prime number on game board 200 has imprinted thereon, in addition to the prime number factorization, an exponential representation of the corresponding space. However, some non-prime numbers may not be represented by an exponential representation of prime numbers. In fact, only 37 spaces contain numbers which show prime number exponential representations, in the exemplary embodiment. For example, the number "6" is not represented by a prime number exponential representation in the exemplary embodiment because there are no prime number exponential representations, other than $2^1 \times 3^1$, which can represent that number.

Table 1 summarizes the information displayed on each space of game board 200 as it actually appears. Prime numbers do not have a prime number factorization or an exponential respresentation displayed on game board 200, and, as such, are not displayed in the table. The integer "1" is not a prime number and no alternative representations are provided.

TABLE 1

| Integer | Prime Number Factorization | Exponential Representation |
|---|---|---|
| 1 | | |
| 2 | | |
| 3 | | |
| 4 | 2 × 2 | $2^2$ |
| 5 | | |
| 6 | 2 × 3 | |
| 7 | | |
| 8 | 2 × 2 × 2 | $2^3$ |
| 9 | 3 × 3 | $3^2$ |
| 10 | 2 × 5 | |
| 11 | | |
| 12 | 2 × 2 × 3 | $2^2 \cdot 3$ |
| 13 | | |
| 14 | 2 × 7 | |
| 15 | 3 × 5 | |
| 16 | 2 × 2 × 2 × 2 | $2^4$ |
| 17 | | |
| 18 | 2 × 3 × 3 | $2 \cdot 3^2$ |
| 19 | | |
| 20 | 2 × 2 × 5 | $2^2 \cdot 5$ |
| 21 | 3 × 7 | |
| 22 | 2 × 11 | |
| 23 | | |
| 24 | 2 × 2 × 2 × 3 | $2^3 \cdot 3$ |
| 25 | 5 × 5 | |
| 26 | 2 × 13 | |
| 27 | 3 × 3 × 3 | $3^3$ |
| 28 | 2 × 2 × 7 | $2^2 \cdot 7$ |
| 29 | | |
| 30 | 2 × 3 × 5 | |
| 31 | | |
| 32 | 2 × 2 × 2 × 2 × 2 | $2^5$ |
| 33 | 3 × 11 | |
| 34 | 2 × 17 | |
| 35 | 5 × 7 | |
| 36 | 2 × 2 × 3 × 3 | $2^2 \cdot 3^2$ |
| 37 | | |
| 38 | 2 × 19 | |
| 39 | 3 × 13 | |
| 40 | 2 × 2 × 2 × 5 | $2^3 \cdot 5$ |
| 41 | | |
| 42 | 2 × 3 × 7 | |
| 43 | | |
| 44 | 2 × 2 × 11 | $2^2 \cdot 11$ |
| 45 | 3 × 3 × 5 | $3^2 \cdot 5$ |
| 46 | 2 × 23 | |
| 47 | | |
| 48 | 2 × 2 × 2 × 2 × 3 | $2^4 \cdot 3$ |
| 49 | 7 × 7 | $7^2$ |
| 50 | 2 × 5 × 5 | $2 \cdot 5^2$ |
| 51 | 3 × 17 | |
| 52 | 2 × 2 × 13 | $2^2 \cdot 13$ |
| 53 | | |
| 54 | 2 × 3 × 3 × 3 | $2 \cdot 3^3$ |
| 55 | 5 × 11 | |
| 56 | 2 × 2 × 2 × 7 | $2^3 \cdot 7$ |
| 57 | 3 × 19 | |
| 58 | 2 × 29 | |
| 59 | | |
| 60 | 2 × 2 × 3 × 5 | $2^2 \cdot 3 \cdot 5$ |
| 61 | | |
| 62 | 2 × 31 | |
| 63 | 3 × 3 × 7 | $3^2 \cdot 7$ |
| 64 | 2 × 2 × 2 × 2 × 2 × 2 | $2^6$ |
| 65 | 5 × 13 | |
| 66 | 2 × 3 × 11 | |
| 67 | | |
| 68 | 2 × 2 × 17 | $2^2 \cdot 17$ |
| 69 | 3 × 23 | |
| 70 | 2 × 5 × 7 | |
| 71 | | |
| 72 | 2 × 2 × 2 × 3 × 3 | $2^3 \cdot 3^2$ |
| 73 | | |
| 74 | 2 × 37 | |
| 75 | 3 × 5 × 5 | $3 \cdot 5^2$ |
| 76 | 2 × 2 × 19 | $2^2 \cdot 19$ |
| 77 | 7 × 11 | |
| 78 | 2 × 3 × 13 | |
| 79 | | |
| 80 | 2 × 2 × 2 × 2 × 5 | $2^4 \cdot 5$ |
| 81 | 3 × 3 × 3 × 3 | $3^4$ |
| 82 | 2 × 41 | |
| 83 | | |
| 84 | 2 × 2 × 3 × 7 | $2^2 \cdot 3 \cdot 7$ |
| 85 | 5 × 17 | |
| 86 | 2 × 43 | |
| 87 | 3 × 29 | |
| 88 | 2 × 2 × 2 × 11 | $2^3 \cdot 11$ |
| 89 | | |
| 90 | 2 × 3 × 3 × 5 | $2 \cdot 3^2 \cdot 5$ |
| 91 | 7 × 13 | |
| 92 | 2 × 2 × 23 | $2^2 \cdot 23$ |
| 93 | 3 × 31 | |
| 94 | 2 × 47 | |
| 95 | 5 × 19 | |
| 96 | 2 × 2 × 2 × 2 × 2 × 3 | $2^5 \cdot 3$ |
| 97 | | |
| 98 | 2 × 7 × 7 | $2 \cdot 7^2$ |
| 99 | 3 × 3 × 11 | $3^2 \cdot 11$ |

Figure 3:
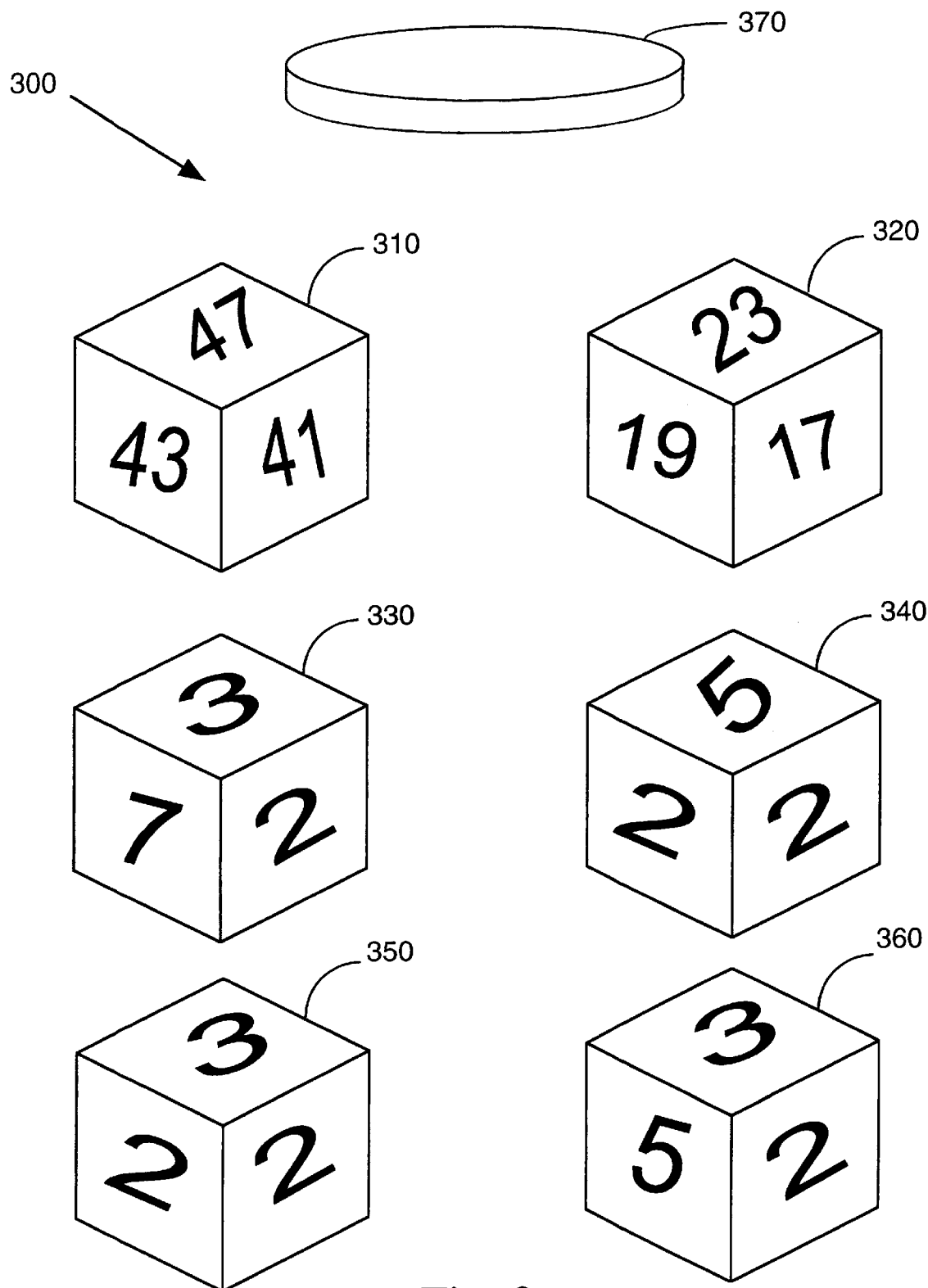
FIG. 3 illustrates a chip and random number generation means used to generate random prime numbers for one embodiment of the present invention.

FIG. 3 illustrates marker, or chip 370, and random number generation means 300 designed to generate random prime numbers for the multiplication game. In the exemplary embodiment, each player in the multiplication game is given his or her own 12 dice to use. The 12 dice are comprised of 6 unique types of dice, each dice having 6 sides, each side having a predetermined prime number imprinted thereon. A first die 310 comprises prime numbers 47, 43, 41, 37, 31, and 29, one number assigned to each side. The relationship of the numbers to each other on the die is immaterial, assuming that the dice are manufactured without imperfections which could lead to an unequal likelihood of one or more numbers being rolled. The second die 320 comprises prime numbers 23, 19, 17, 11, 13, and a wild card, which can be used as any prime number by the players. The third die 330 comprises prime numbers 2, 2, 2, 2, 3, and 7. The forth die 340 comprises prime numbers 2, 2, 2, 2, 3, and 5. The fifth die 350 comprises prime numbers 2, 2, 2, 3, 3, and 5. The sixth die 360 comprises prime numbers 2, 2, 3, 3, 5, and 7. Players use a quantity of one of first die 310, two of second die 320, two of third die 330, two of fourth die 340, two of fifth die 350, and three of sixth die 360 to make up the 12 dice used on each round of play.

It should be noted that the above assignment of prime numbers to dice, the number of sides to each die, and the total number of dice used are merely one possible embodiment of arranging random number generation means 300. In addition, one or more wild card spaces could be assigned to second die 320, or to other dice in the game. Nor do the wild cards have to be pre-assigned on second die 320. One or more pressure sensitive wild card spaces could be provided with the game, the players deciding how many and where to place them. In the case of no wild cards being pre-assigned, second die 320 would have a predetermined prime number in place of the normally pre-assigned wild card space, in the exemplary embodiment, one of second die 320 has the prime number "11" in place of the wild card, and the second of second die 320 has the prime number "13" in place of the wild card. Finally, the present invention is not limited to using dice to generate random prime numbers. Any well known method for generating prime numbers could be used instead.

Board game 200 further comprises a plurality of markers, or chips, one of which is shown in FIG. 3 as chip 370. The chips are used to denote ownership of a space by a player after it has been occupied or "captured". In the exemplary embodiment, chip 370 is circularly-shaped, approximately half an inch to one inch in diameter, and one eighth inch thick. In addition, chip 370 is manufactured from a translucent material, such as clear plastic, so that players may see which integer is covered after chip 370 has been placed upon an occupied space. Of course, chip 370 could comprise any number of geometric shapes and sizes, as well as being manufactured from a non-translucent material. Furthermore, chips are uniquely distinguished from other chips by providing different colored chips with the game. For example, in the exemplary embodiment, 25 chips are colored red, 25 chips are colored green, 25 chips are colored blue, and 25 chips are colored yellow. The number of chips provided in board game 200 are generally such that for two players, each player will have enough chips to cover as many spaces as can be expected to occupy in a single game.

Figure 4A:
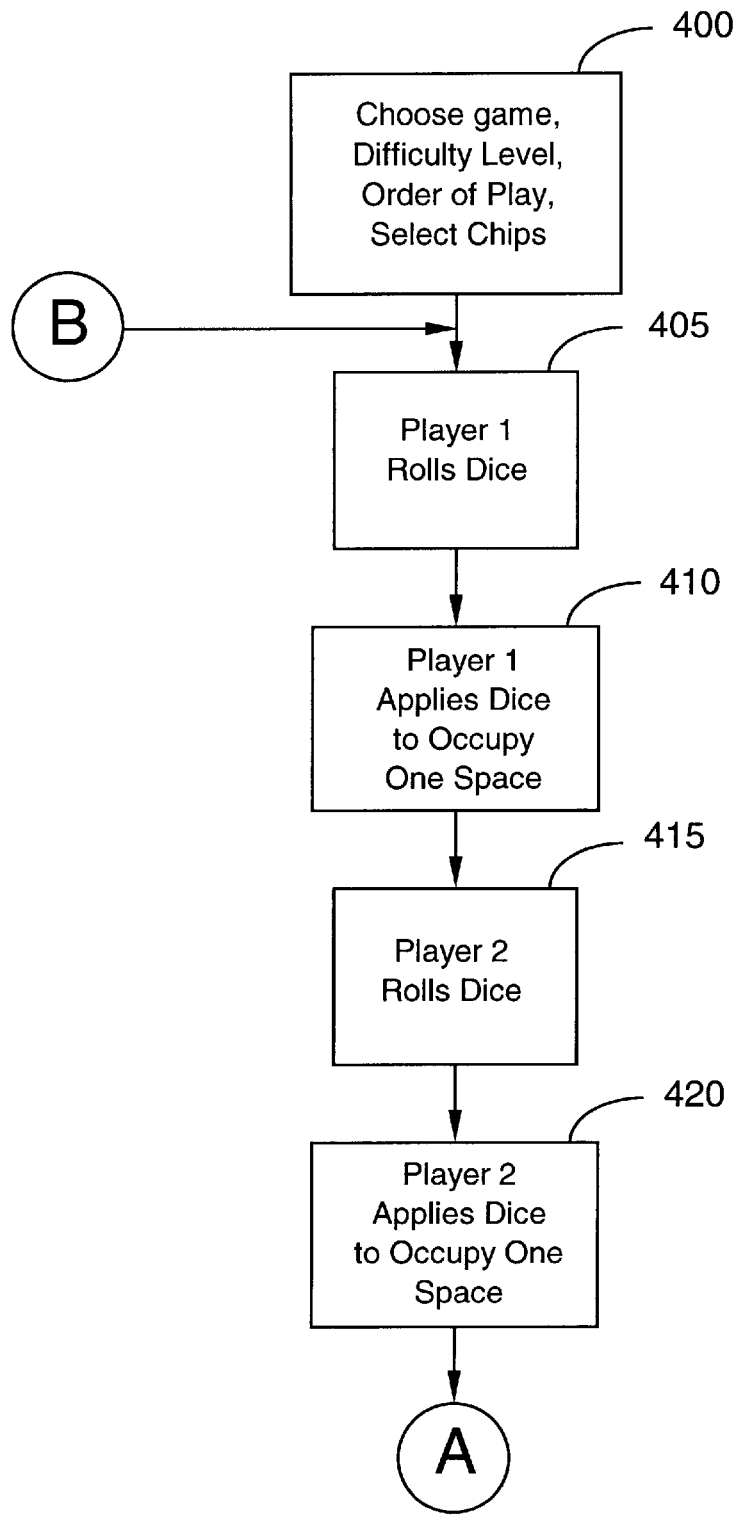
FIGS. 4a and 4b illustrate the steps comprising the method of play for one embodiment of the present invention.
Figure 4B:
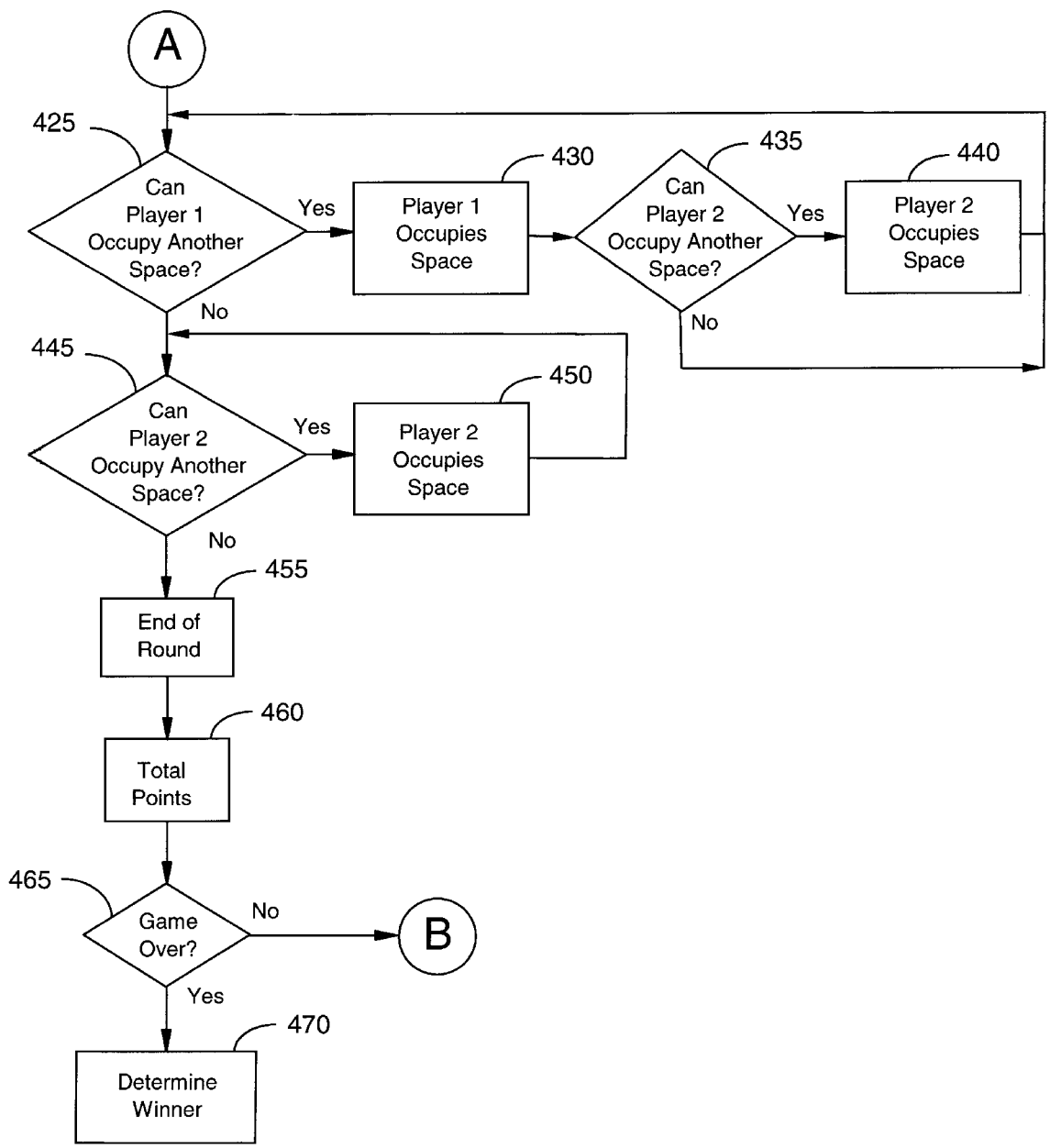

As stated earlier, at least two different types of mathematical games can be played using game board 200. The first game is a multiplication game and a second game is a combination addition and subtraction game. Either type of game may be played with as little as two players to as many players as practical. Two or more players may form a team and play against other teams, ideally having the same number of players in each team competing against each other. In this embodiment, only 1 set of dice are used by each team. Generally, more than four players or teams is not recommended because bonus points will become difficult to obtain, as explained below. FIGS. 4a and 4b illustrate the steps comprising the method of play for the multiplication game.

The multiplication game is played by allowing each player to select a uniquely colored number of chips 370, and determining the order of play, as indicated in step 400 of FIG. 4a. Random number generation means 300 is used to determine the order of play, with the player generating the highest number playing first, followed by the player rolling the second highest number, and so forth. However, any other methods for selecting the order of play are possible, such as allowing the player generating the lowest number playing first, or allowing the youngest player to play first.

As explained previously, random number generation means 300 comprises well known, six-sided dice, each having six faces and each face comprising a single, predetermined prime number. When determining the order of play, each player generally rolls a single die to generate a random number. However, during regular game play, each player uses a plurality of dice, as explained below. Other well known random number generation means may be used alternatively. For purposes of simplicity for the remaining discussion herein, the random number generation means will be referred to as one or more dice.

The players will also determine which of the two games are to be played at this step. This is done by mutual consensus of the players. As will be explained, the game comprises several different versions, for example, a multiplication game or an addition/subtraction game, in the exemplary embodiment. Younger players may desire to play the addition/subtraction game prior to trying the multiplication game, which is generally more suited for younger players as they generally learn addition and subtraction before they learn multiplication in school. The steps of FIGS. 4a and 4b represent the multiplication game. The steps of the addition/subtraction game will be explained later herein.

In addition to varying the level of difficulty by choosing one of several possible games, another way to vary the level of difficulty in the exemplary embodiment is to select either first side 210 or second side 215 of game board 200 to play on. In the exemplary embodiment, first side 210 comprises 100 spaces, each space having an integer of between 1 and 99 in the exemplary embodiment, a prime number factorization 240 representing the integer imprinted thereon, and one logo space 100. In addition, an exponential representation of the corresponding integer is imprinted within certain spaces, as explained above. Second side 215 is similar to first side 210, second side having 100 spaces, each space comprising an integer of between 1 and 99, and one logo space 100, in the exemplary embodiment. However, spaces on second side 215 do not have either prime number factorization 240 or exponential representation 250 imprinted within each space. Second side 215 is the more difficult side than first side 210 because players using second side 215 do not have the benefit of seeing each integer expressed in alternative representations, which is a benefit that will be explained later herein.

As shown in FIG. 4a, once the order of play, distribution of chips 370, the game to be played, and the level of difficulty has been determined in step 400, a first round of play begins by the first player rolling a predetermined number of dice, equal to 12 dice in the exemplary embodiment, shown as step 405. A round is comprised of one or more "turns", or chances, for players to occupy spaces using unused dice from a previous turn. A round is completed when no further spaces can be occupied by any player. Each player rolls all of his or her given dice only one time per round, generally during their first turn in any given round.

Although 12 dice are used in the exemplary embodiment, a greater or a fewer number of dice may be used in the alternative. As an example, suppose that a first player rolls a 2-2-2-2-3-7-17-2-3-5-13-37, each of the previous numbers representing one face on each die rolled. During the first player's turn, an attempt is made to occupy a single space on game board 200 by applying the rolled dice to match a prime number factorization of any space, shown as step 410. For example, using the example roll above, the first player may wish to occupy space 104, having the integer "4" imprinted thereon. The prime number factorization of the integer "4" is "2×2". The first player may wish to occupy space 104 by announcing to the other players that the integer "4" comprises prime factorization 2×2, and then places the two dice which make up the prime factorization of "4" (i.e., one die showing "2" and a second die showing "2") on space 104. If a player attempts to occupy a space using an incorrect factorization, that player loses his turn in that instance, but not for the entire round. If a player is not able to occupy a space because the dice cannot be arranged to form a product corresponding to an unoccupied space, play proceeds to the next player. Any dice used to occupy a space during a player's turn are not used for occupying other spaces during a current round of play.

Advantageously, the multiplication game does not require any multiplication skills prior to playing the game. Young players who may not have been exposed to multiplication can easily play the game simply by matching dice to the prime number factorizations printed for each integer on game board 200. The present invention, therefore, introduces young players to multiplication in a non-threatening and comfortable manner whereby mathematical skills are intuitively learned.

Referring again to FIG. 4a, assuming that the first player has completed his or her turn by occupying a space and placing the dice which comprised the prime number factorization onto the unoccupied space, a second player rolls his own set of dice, shown as step 415, which are identical in appearance to the first player's dice. The second player then proceeds as the first player, occupying a space by using the dice to match the prime factorization 240 of any space which has not been occupied by the first player, shown as step 420. The second player, having seen the first player's rolled dice and subsequent space occupation, may chose a strategy based upon either blocking the first player from completing contiguous spaces between prime numbered spaces, or the second player may chose to be aggressive and try to occupy spaces needed for his or her own contiguous completion, or a combination of both strategies, that is, choosing a space that both prevents other players from completing a contiguous completion and which aids the second player in completing his own contiguous series of spaces between prime numbered spaces. The second player's turn ends after he or she has occupied a space or is unable to do so with the dice that he or she has left to play.

After the second player has completed his turn, any other players take their turns, each subsequent player rolling his or her own 12 dice and using the dice to occupy spaces based on the prime number factorizations found within the spaces, repeating the steps of 415 and 420. For ease of describing the present invention, only two players are assumed henceforth.

After the second player has completed his turn by occupying a space in step 420, it must be determined whether or not the first player can occupy another space using his or her remaining dice, shown as step 425 in FIG. 4b. If the first player is able to occupy another space using his or her remaining dice from the first roll, the space is occupied by the first player placing the dice comprising the prime number factorization of the space which is to be occupied onto the space, shown as step 430. Otherwise, flow continues to step 445, described below.

After step 430, the second player determines whether or not another space can be occupied using his or her remaining dice. If the second player is able to occupy another space using his or her remaining dice from the first roll, the space is occupied by the second player placing the dice comprising the prime number factorization of the space which is to be occupied onto the space, shown as step 440. If not, the process continues back to step 425, where the first player tries to opportunity another space.

If the first player cannot occupy a space as determined in step 425, the second player determines whether or not another space can be occupied in step 445, using his or her remaining dice. If so, the space is occupied by placing the dice comprising the prime number factorization of the space which is to be occupied onto the space, shown as step 450. Flow then repeats back to step 445, where the second player again tries to occupy another space using his or her remaining dice. The first player does not attempt to occupy any further spaces because no further spaces will become available once a player has determined that no further spaces can be occupied. In an alternative embodiment, flow continues back to step 425, so that the first player is afforded an opportunity to occupy another space. This embodiment allows a player who erroneously thought that no spaces could be occupied another chance to capture a space.

Steps 425 through 445 can be summarized to say that play alternates between the two players until one of the two players can not occupy any more spaces. In that case, the other player may continue to occupy spaces, until he or she can not occupy any more. When neither player can occupy any further spaces, the first round comes to an end, shown as step 455. There is no penalty for having unused dice at the end of a round.

After the end of the round, players total their points, and pick up all dice, as shown in step 460. In step 465, it is determined if the game is over. This could be the result of one of several circumstances including one of the players achieving a predetermined point total, or a predetermined time period has expired, among others. If it is determined that the game is not over, a subsequent round of play occurs with the second player rolling all of his or her predetermined number of dice in step 405. If it is determined that game play has finished, a game winner is determined in step 470. Generally, the player having the greatest point total is declared the winner.

Figure 5:
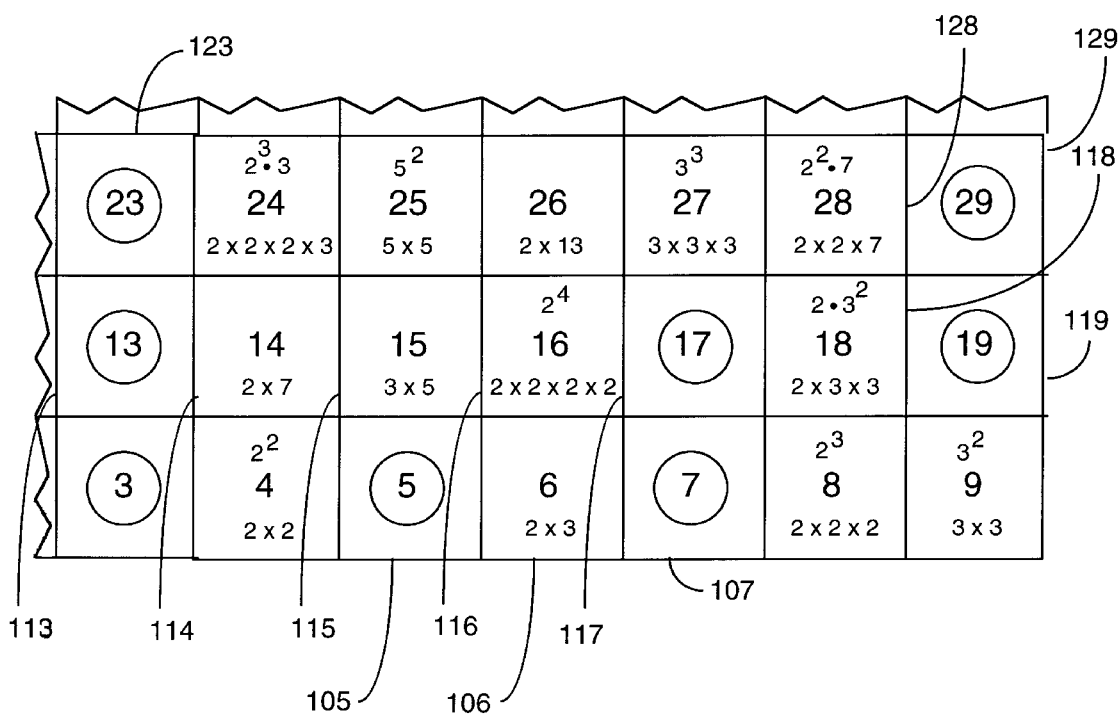

During game play, players receive a predetermined number of points for each space occupied, one point per space occupied in the exemplary embodiment. The player who reaches a predetermined point total first is generally the winner. In the exemplary embodiment, the predetermined number is 49. Alternatively, the player with the most points at the end of a predetermined time period is the winner. In either case, a time limit may be placed on each player in order to limit the time he or she has to occupy a space so that play may be expedited. Spaces comprising prime number integers may not be occupied by any player at any time, therefore, there will never be a chip placed on them. (Conversely, in the addition/subtraction game, the goal is to have chips only on spaces containing prime numbers.) Bonus points are awarded for a player occupying contiguous spaces between prime number spaces, either horizontally, vertically, or diagonally. FIG. 5 illustrates this principle, showing a section of game board 200.

Assume that a first player has rolled his or her 12 dice to obtain the following result: 2-2-2-2-3-7-17-2-3-5-13-37. Using this roll, a player could chose to occupy space 106, representing integer "6", comprising prime factorization 2×3. As shown in FIG. 5, space 106 lies between space 105 and space 107. Therefore, if the first player chooses to occupy space 106 using two dice as explained above, he or she will receive one point for occupying a space and one bonus point for each contiguous space occupied between two prime numbered spaces, namely space 105 and space 107. If the first player chose, he or she could have used a "2" and a "7" from the above example roll and occupied space 114, having integer "14" imprinted thereon. Again, the first player would score one point for occupying a space, and one bonus point for each contiguous space occupied in between two prime numbered spaces, namely space 123 and space 105.

It just so happens, in the above examples, that only one space lies in between two prime numbered spaces, therefore only one bonus point can be obtained by occupying either of these two spaces. However, using a different example, if one player has occupied space 114, space 115, and space 116, upon occupying the last of these three spaces, four total points would be awarded to that player. One point for occupying the last of the three spaces and three bonus points, one bonus point for each space occupied in between two prime numbered spaces, in this case, space 113 and space 117. In one embodiment, a player must occupy all spaces in between two prime numbered spaces to receive any bonus points. In another embodiment, the last player to complete a contiguous number of spaces in between two prime numbered spaces receives one bonus point for each contiguous space occupied, whether or not each of the contiguous spaces has been occupied by that player or not.

In another example, a single space may lie in between two sets of prime numbers. For example, referring again to FIG.

5, space 118 lies between space 117 and space 119, containing prime numbers 17 and 19, respectively. Space 118 also lies diagonally between space 107 and space 129, containing prime numbers 7 and 29, respectively. In the exemplary embodiment, only one bonus point is given for occupying a space which has two ways to meet the bonus point criteria. This is to reduce the advantage that the first few players would have in being able to occupy these valuable spaces simply by playing first. In another embodiment of play, one bonus point is given for each pair of prime number spaces which a occupied space lies between. In this case, a player occupying space 118 would be awarded three total points, one point for occupying the space, one bonus point for occupying a space between space 117 and 119, and one bonus point for occupying a space between space 107 and 129.

The concept of bonus points adds an element of strategy to the game. On one hand, a player may wish to occupy spaces directly between two prime numbered spaces so that an immediate bonus point will be awarded. On the other hand, a player may wish to take a chance and occupy a space having no immediate bonus point, however, having the possibility of receiving more than one bonus point, if that player can occupy the required space or spaces before another player can block the contiguous string of spaces.

At the end of each round, when no player can occupy any more spaces, players tally their points by replacing the dice on their occupied spaces with a distinguishable chip 370, and then awarding one point for every space occupied plus one bonus point for each contiguous space occupied which lies in between two prime numbered spaces. After the points are tallied in round one, round two begins by player two rolling his dice first, and occupying a space based upon his or her roll. By alternating which player rolls first, the advantage of seeing what others have rolled and occupied is evenly distributed. Play continues until either a predetermined point total is reached or a predetermined time period has expired.

As an alternative to the prime number factorization method of play, a variation of the multiplication game can be accomplished by representing each integer on game board 200 as the product of two factors. In this variation, learning is enhanced by reinforcing the multiplication table and various combinations of numbers that can represent a particular number. For example, the integer "36" can be represented as 2×18, 3×12, 4×9, or 6×6. A player wishing to occupy the space containing 36, in this embodiment, is required to recite to the other players all two-factor combinations which is equal to 36. Similar to the original multiplication game, a player rolls the 12 dice to obtain 12 randomly generated prime numbers. Players use the 12 dice by separating dice which are used to form a representation. For example, if a player rolls a 2, 2, 2, 2, 2, 3, 3, 29, 11, 13, 7, and a 5, the player can place the dice showing a 3, 3, 2, and 2 aside and occupy space 36 by reciting to the other players that the dice represent all the possible two-factor products of 36. For example, the player would announce something similar to "36 equals 2×18, 3×12, 4×9, and 6×6" while placing the die displaying the 3, 2, 2, and 3 onto the space containing integer 36. A player must recite all of the two-factor products correctly to occupy the space, and a chip is placed on the occupied space. Otherwise, the player loses his turn. A list of all two-factor products for each integer may be recorded to ensure that a player has correctly recited all of the two-factor products for the particular integer being occupied. As an alternative, a player must group the dice into the various multiplication combinations possible. For example, a player would have to arrange the dice to show that 36 is equal to 2×(2×3×3), 3×(2×2×3), (2×2)×(3×3), and (2×3)×(2×3). Arranging the dice in this manner reinforces learning for the player arranging the dice as well as for the other players.

After the first player's turn has ended by occupying a space or losing a turn, the next player in turn rolls his or her dice and tries to occupy a space in a similar manner. When play returns to the first player, he or she must use the remaining dice to try to occupy another space. Play continues in a round until no player is able to use the remaining dice to form a two-factor product for any integer. Then, each player picks up their 12 dice and a new round of play begins with the second player rolling first, with play continuing to the subsequent players. Again, players receive one point for occupying a space and one bonus points for each contiguous space occupied between two prime numbers on game board 200.

In yet another embodiment of the multiplication game, exponential representations are used, if desired, by the players instead of the prime number factorizations. Players roll a predetermined number of dice, as before, and use the roll to occupy spaces by matching the dice to the exponential representation of integers. For example, an exponential representation for space 128 having integer "28" imprinted thereon is equal to "$2^2 \cdot 7$". The "•" sign is used to denote multiplication, frequently used in algebra, rather than the "×" sign as is frequently used in arithmetic. The "•" sign is used instead of the "×" sign to introduce players to this "new" way to represent multiplication in a non-threatening manner by allowing players to see that the "×" and the "•" mean the same thing.

As an example of play, a player wishing to occupy space 128 would have to roll a "2", "2", and a "7". Although the same combination of dice is used to occupy a space using exponential representation instead of prime number factorization, players learn how exponents work in a non-threatening manner. Players can see that, in the above example, "28" can be represented in either representation, and that the "scary" exponential representation is nothing more than a new way to express the more familiar prime number factorization representation.

For older players, the level of difficulty of the multiplication game can be increased by using second side 215 of game board 200. Second side 215 looks very much like first side 210, having a predetermined number of spaces, each of the spaces containing an integer imprinted thereon. However, unlike first side 210, spaces on second side 215 contain no prime number factorizations or exponential representations of the integers. Players wishing to occupy spaces must understand multiplication well enough to figure out what the prime number representations are, either in standard representation using prime number factorization, exponential representation, or one or more standard factorizations. When using second side 215, a time limit for each player to occupy a space is generally desirable, for example, between 15 and 45 seconds. The time limit adds a factor of difficulty to the game because it forces players to quickly figure out what the alternative representations of the integers are. If a player tries to occupy a space using an incorrect combination of dice, that player loses his turn in that instance, but not for the entire round. For example, if a player, after rolling a predetermined number of dice, attempts to occupy space 196 containing integer "96" by using a "2", "2", "2", "2", and a "3" by placing the dice on space 196, that player will not be allowed to hold this space because 2×2×2×2×3 is equal to 48, not 96. In this case, the dice are removed from space 196 and the next player in turn attempts to occupy a space. After all other players have taken their turn, the player who lost space 196 previously may now attempt to occupy a space using the dice including the dice used in the previous unsuccessful attempt. In an alternative embodiment, the player may not use the dice which was used in the previous unsuccessful attempt.

As a variation to this more difficult level of play using second side 215, players must speak the prime number factorization or exponential representation of a space as they attempt to occupy it. Verbalization is an effective way to further ingrain the mathematical concepts into players as they play the game. Alternatively, or in addition to verbalization, players must write the prime number factorization or exponential representation of a space they wish to occupy. Writing is an effective technique to increase learning.

As mentioned previously, a combination addition and subtraction game may be played in the alternative by using game board 200. The combination addition game and subtraction game (hereinafter "addition/subtraction game) is played using second side 215. In this embodiment of the game, players attempt to occupy spaces containing prime numbers imprinted thereon. The player occupying a predetermined number of spaces first is the winner. Alternatively, the player having occupied the most spaces in a predetermined time period is the winner. This addition/subtraction game is more suitable for younger players who have not yet been exposed to multiplication, however, as it will be explained, players of any age can play.

As in the multiplication game explained above, players choose the order of play, and whether they will play the addition/subtraction game or the multiplication game. For younger players, a single die is used as the random number generator, the die having a predetermined number of sides, in the exemplary embodiment, 10 sides. The sides are numbered from 0 to 9. For players having greater mathematical skills, the random number generator comprises two dice, a "ones" die having 10 sides numbered from 0 to 9, identical to the single die as explained above, and a "tens" die having 10 sides numbered as follows: 00, 10, 20, 30, 40, 50, 60, 70, 80, and 90. More experienced players rolling the two, 10-sided dice may roll a number between 1 and 99 by combining the "tens" die with the "ones" die, while younger players using the single 10-sided die may roll a number between 0 and 9.

However many die are used, the player chosen to play first begins by rolling the die(dice) to establish an initial number. The initial number is then used to occupy a space on game board 200 that a player may wish to occupy, keeping in mind that the object of the game is to occupy spaces containing prime numbers imprinted thereon. On any player's first roll, the initial number is checked against game board 200 to determine if a space corresponding to the initial number is occupied by another player. If it is not, the player places a chip 370 on the space corresponding to the initial number and the next player rolls the same die(dice) to begin his or her turn. If a space is occupied by another player's chip 370, the player loses his turn. Alternatively, that player is given another opportunity to occupy a space by allowing the player to roll the die(dice) one or more successive times, until a space is able to be occupied. In another embodiment, a player is allowed only one further opportunity to re-roll his or her dice. Each player, in succession, rolls the same die(dice) as the other players to establish an initial number, and a chip 370 is placed on a space on game board 200 corresponding to the initial number if it is not already occupied by another player's chip 370.

After all players have had a chance to occupy a space using their initial number, the first player rolls the die(dice) for a second time. The second number that is rolled is used in conjunction with the initial number to occupy a second space, or the second number may be used by itself to occupy a second space, especially if the second number is a prime number. The second number rolled may be either added to or subtracted from the initial number to generate a sum or a difference. A space on game board 200 corresponding to the sum or difference may then be occupied if no other player's chip 370 already has occupied the particular space. If the difference is equal to a negative number, no space can be occupied corresponding to the negative number. In an alternative embodiment, using a game board 200 having negative numbers, corresponding spaces may be occupied by a negative result. Players then may place one chip 370 on a space on game board 200 corresponding to the sum or one chip 370 on a space corresponding to the difference, if no player's chip 370 already occupies a space. In either case, a player may only occupy one space per turn, using a single chip per space.

Each player in turn rolls the die(dice) for a second time and attempts to occupy spaces by adding or subtracting a current roll with previously occupied spaces, as explained above. On a third roll, players may use any previously occupied spaces to either add or subtract the third number rolled to the previously occupied spaces. For example, if a player already occupies spaces 110, 114, and 106, corresponding to integers 10, 14, and 6, respectively, and rolls a 3 as the fourth number rolled, that player can place a chip 370 on a space as follows. The player could place a chip 370 on space 103, representing the "3" that was rolled, or a chip 370 on space 107 (space 110−3), or a chip 370 on space 113 (space 110+3), or a chip 370 on either space 111 or space 117 (space 114+/−3), or a chip 370 on space 103 or space 109 (space 106+/−3) Again, only 1 chip may be placed on a space during a player's turn.

In one embodiment, a limit is placed on the number of chips 370 that any one player can have on game board 200, for example, 10 chips. After a player occupies five spaces using chips 370, a subsequent space can only be occupied by removing a chip 370 from a previously occupied space. In this embodiment, the player having the most prime number spaces occupied at the end of the game is the winner. Alternatively, each player's captured spaces are totaled, adding the integers corresponding to occupied spaces. The player having the highest total is the winner. Alternatively, only the integers corresponding to spaces containing prime numbers are added together to determine a point total.

As one can see, the further the game play extends, more and more additions and subtractions must be calculated by players per turn as more and more spaces are occupied. The game ends when a player reaches a predetermined point total, players scoring one point for every space occupied containing a prime number. Alternatively, the game ends when all spaces containing prime numbers are occupied, the player having the most spaces containing prime numbers at that time being the winner. Alternatively, the player having the highest point total after a predetermined time period is the winner. A time limit may be used to limit the amount of time that players have to perform the calculations per turn.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. Apparatus for playing a mathematical board game comprising:
   a game board comprising a first predetermined number of spaces, each of said spaces assigned a corresponding unique integer;
   random number generator means;
   means for denoting ownership of at least one of said spaces; and
   a prime number factorization imprinted within each of said spaces, each of said prime number factorizations equal to said corresponding unique integer assigned to each of said spaces.

2. Apparatus of claim 1 further comprising a prime number exponential representation imprinted within each space capable of being expressed by said prime number exponential representation, said exponential representation equal to said corresponding unique integer assigned to a each of said spaces.

3. Apparatus of claim 1 wherein said spaces each comprise a square shape.

4. Apparatus of claim 1 wherein said predetermined number of spaces is equal to 100 spaces.

5. Apparatus of claim 1 wherein said random number generator means comprises a predetermined number of dice, each of said dice having at least six sides.

6. Apparatus of claim 5 wherein each of said sides is assigned a prime number.

7. Apparatus of claim 5 wherein each of said dice comprises at least ten sides, each side assigned a unique number from 0 to as many sides comprising said dice.

8. Apparatus of claim 1 wherein the means for denoting ownership is a chip.

* * * * *